United States Patent
Schumacher

(10) Patent No.: US 9,528,914 B2
(45) Date of Patent: Dec. 27, 2016

(54) NON-INTRUSIVE SENSOR SYSTEM

(71) Applicant: ROSEMOUNT, INC., Eden Prairie, MN (US)

(72) Inventor: Mark Stephen Schumacher, Minneapolis, MN (US)

(73) Assignee: ROSEMOUNT, INC., Eden Prairie, MN (US)

( * ) Notice: Subject to any disclaimer, the term of this patent is extended or adjusted under 35 U.S.C. 154(b) by 581 days.

(21) Appl. No.: 14/039,957

(22) Filed: Sep. 27, 2013

(65) Prior Publication Data

US 2015/0094988 A1    Apr. 2, 2015

(51) Int. Cl.
| | |
|---|---|
| *G01M 99/00* | (2011.01) |
| *G05B 17/02* | (2006.01) |
| *G05B 19/418* | (2006.01) |
| *G05B 23/02* | (2006.01) |

(52) U.S. Cl.
CPC .............. *G01M 99/00* (2013.01); *G05B 17/02* (2013.01); *G05B 23/0221* (2013.01); *G05B 2219/37537* (2013.01)

(58) Field of Classification Search
CPC ....... G01M 99/00; G05B 17/02; G05B 19/418
USPC ......................................................... 702/188
See application file for complete search history.

(56) References Cited

U.S. PATENT DOCUMENTS

| | | |
|---|---|---|
| 6,760,716 B1 | 7/2004 | Ganesamoorthi et al. |
| 6,970,762 B1 | 11/2005 | Elliott et al. |
| 7,127,360 B2 * | 10/2006 | Gysling .................... G01F 1/74 |
| | | 702/100 |

OTHER PUBLICATIONS

Hodouin, "Methods for Automatic Control, Observation, and Optimization in Mineral Processing Plants," *Journal of Process Control*, 21(2):211-225 (2010).
Kadlec et al., "Data-Driven Soft Sensors in the Process Industry," *Computers & Chemical Engineering*, 33(4):795-814 (2009).
Leonow et al., "Soft Sensor Based Dynamic Flow Rate Estimation in Low Speed Radial Pumps," European Control Conference, pp. 778-783 (2013).
Skeie et al., "Level Estimation in Oil/Water Separators Based on Multiple Pressure Sensors and Multivariate Calibration," *Journal of Chemometrics*, 24(7-8):387-398 (2010).

(Continued)

*Primary Examiner* — Bryan Bui

(74) *Attorney, Agent, or Firm* — Marshall, Gerstein & Borun LLP

(57) ABSTRACT

A non-intrusive sensor system includes an array of sensors disposed in a process to measure various input process phenomena and a logic unit that analyses the sensor measurements using an empirical model to produce an estimate of a further process phenomenon not measured directly by any of the array of sensors. The sensors within the array of sensors may be non-intrusive sensors that measure input process phenomena in an intrusive or non-intrusive manner but are non-intrusive with respect to the output process phenomenon as none of these sensors comes into direct contact with the process fluid or process element exhibiting the output process phenomenon. The sensors within the array of sensors can be any type of sensors that produce a measurement of a particular process phenomenon at the same or at different locations within a process.

58 Claims, 8 Drawing Sheets

(56) References Cited

OTHER PUBLICATIONS

Zamprogna et al., "Optimal Selection of Soft Sensor Inputs for Batch Distillation Analysis," *Journal of Process Control*, 15(1):39-52 (2005).

International Search Report and Written Opinion for Application No. PCT/US2014/057602, dated Jan. 20, 2015.

International Preliminary Report on Patentability for Application No. PCT/US2014/057602, dated Mar. 29, 2016.

\* cited by examiner

NON-INTRUSIVE SENSOR SYSTEM

FIELD OF THE DISCLOSURE

This patent relates generally to systems and methods for collecting and analyzing process device and control system performance data and, more particularly, to a system and method for implementing an enhanced non-intrusive sensor system within a process for monitoring, maintenance and/or control activities.

BACKGROUND

Process plant monitoring, maintenance and control systems, like those used in chemical, petroleum or other processes, typically include one or more process controllers and input/output (I/O) devices communicatively coupled to at least one host or operator workstation, a maintenance workstation and to one or more field devices via analog, digital or combined analog/digital buses. The field devices, which may be, for example, valves, valve positioners, switches and transmitters (e.g., temperature, pressure and flow rate sensors), perform process control functions within the process such monitoring process variables or other physical phenomena for any reason, performing control functions such as opening or closing valves, measuring process parameters, etc. The process controllers, monitoring and maintenance applications receive signals indicative of measurements made by the field devices, process this information to implement a monitoring, a control or a maintenance routine, and generate control signals, maintenance instructions or other signals that are sent over the buses or other communication lines to operators or to the field devices to, for example, monitor a process, control the operation of the process or to perform maintenance tasks. In this manner, process controllers, monitoring applications and maintenance applications may execute and coordinate monitoring, control and maintenance strategies using the field devices via the buses and/or other communication links. Likewise, monitoring and maintenance applications may recognize problems and coordinate maintenance activities within the plant such as repairing devices, testing devices, detecting poorly performing devices, implementing calibration and other maintenance procedures, etc.

Process information from the field devices and the controllers may be made available to one or more applications (i.e., software routines, programs, etc.) executed by the operator or maintenance workstations (e.g., processor-based systems) to enable operator or maintenance personnel to perform desired functions with respect to the process, such as viewing the current state of the process (e.g., via a graphical user interface), evaluating the process, modifying the operation of the process (e.g., via a visual object diagram), tuning or calibrating devices, etc. Many process plant instrumentation systems also include one or more application stations (e.g., workstations) which are typically implemented using a personal computer, laptop, or the like and which are communicatively coupled to the controllers, operator workstations, and other systems within the process control system via a local area network (LAN). Each application station may include a graphical user interface that displays the process control information, monitoring information and maintenance information including values of process variables, values of quality parameters associated with the process, process fault detection information, and/or process and device status information.

In any event, sensors (also referred to as transmitters or process control devices) are generally disposed in a process plant at various locations to measure various process parameters or process phenomena, such as temperature, pressure, fluid flow, fluid level, etc. In other cases, samples may be taken from the process at various locations and these samples may be tested or analyzed offline to determine other types of process phenomena, such as PH level, viscosity, etc. Generally, the sensors or transmitters provide or communicate the measured or determined process parameter values to a control routine, a maintenance routine or device, a user interface or other device within the network for processing and/or display.

Due to their complexity, process plants typically require a large number of measurements to be made to ensure process safety and to provide adequate process control and monitoring information to plant systems and operating/maintenance personnel. In general, the more information that can be obtained at more measurement points, the better the plant can be made to operate. However, one hindrance to using more instrumentation is the total cost of installation. These costs include the purchase price, the installation cost and the system integration costs associated with the use of more measurement devices. If these costs can be brought down, users can afford more instrumentation.

Moreover, most sensors in use and installed in process plants today are intrusive in nature, in that these sensors must have some element thereof physically disposed in, connected to or touching the process fluid or other process element exhibiting the physical phenomenon which the sensor is to measure. As such, in many plant situations, it is only practical or possible to adequately install process parameter measurement devices, e.g., sensors, when constructing or installing the plant equipment. In other cases, installing a sensor at a particular point in the plant may require significant retrofitting of the plant equipment, at significant cost. In still other situations, it is impossible to place a sensor in a position at which the sensor can come into contact with and thereby measure the process fluid or process equipment at which the phenomenon is to be measured.

To alleviate these problems and to make installation of sensors easier in many situations, a number of non-intrusive sensors have been developed, which operate to measure a process parameter or process phenomenon without needing to come into direct contact with the process fluid or process equipment exhibiting the process phenomenon or at which the process phenomenon is to be measured. For example, temperature sensors have been developed to use infra-red light to detect the temperature of a vessel, wall or fluid, without needing the sensor to come into direct contact with that vessel, wall or fluid. Of course, other types of non-intrusive sensors exist. As a result, non-intrusive sensors are typically easier to install, and thus can reduce installation costs associated with the addition of more sensors in a process plant.

However, unfortunately, non-intrusive sensors tend not to be as accurate as traditional intrusive sensors with respect to measured process variables. Thus, while using measurement devices that do not require an intrusion into the process, but that instead make the measurement from outside a pressure boundary or outside the containment vessel, can substantially reduce installation and retrofitting costs, making measurements with such non-intrusive sensors will make the measurements less accurate. This fact will, in turn, make the measurements more suspect and less desirable in many uses, such as for process control purposes, maintenance decision making purposes, etc.

SUMMARY

A non-intrusive sensor architecture that is easier to install within a process, such as a process implemented in a process plant, a stand-alone process, etc., and that provides for higher accuracy of measurements includes an array of sensors disposed to measure various input process phenomena and a logic unit that analyses the sensor measurements to produce an empirical estimate of a further or output process phenomena not measured directly by each of the array of sensors. At least one of the sensors within the array of sensors (and possibly all of the sensors within the array of sensors) are non-intrusive sensors in that, while they may measure input process phenomena in an intrusive or non-intrusive manner, they are non-intrusive with respect to the output process phenomenon, as these sensors do not come into direct contact with the process fluid or process element exhibiting the output process phenomenon. The sensors within the array of sensors may be any types of sensors (e.g., temperature, vibration, pressure, etc.) that produce a measurement of a particular process phenomenon at the same or different locations within a process, with these measurements being used by the logic unit to produce an estimate of the output process phenomenon (also referred to herein as the non-intrusively measured process phenomenon). For example, the input sensors may be all of the same type (e.g., temperature or vibration) measuring the same type of process phenomenon at, for example, different locations in the process, or may be of different types measuring different types of process phenomena at the same or different locations within the process. The output process phenomenon determined by the sensor system may be the same or a different type of process phenomenon as measured by any or all of the input sensors (e.g., fluid flow).

Thus, generally speaking, an sensor system includes a plurality of non-intrusive sensors set up to measure one or more types of process phenomena, such as temperature, pressure, flow, vibration, etc. and coupled to a logic engine. The logic engine includes a model or logic based estimator that estimates an output process phenomenon, such as flow, temperature, pressure, etc., based on the values of the measured and received input process parameters. The logic engine then provides the determined output process phenomenon variable value to a user, such as a control routine, a user display, a maintenance application, an alarm or alert generator, etc. If desired, the logic engine may also detect a fault or problem with one or more of the plurality of input sensors based on the input sensor information provided thereto.

In one embodiment, a measurement system for use in analyzing an operation of process equipment within a process includes a plurality of sensors disposed within the process, wherein at least one of the plurality of sensors is a non-intrusive sensor and wherein each of the plurality of sensors measures a different physical process phenomenon within the process to produce a sensor measurement indicative a physical process phenomenon, and includes a logic module that is communicatively coupled to each of the plurality of sensors to receive the sensor measurements. In this case, the logic module includes a logic engine and a model that relates measurements of the values of each of the different physical process phenomenon to a further physical process phenomenon, and the logic module operates on a computer processor device to determine a value of the further physical process phenomenon using the model and the sensor measurements.

If desired, each of the plurality of sensors is disposed in a different one of a set of process devices, which may be process control devices, measurement devices, or any other type of process device, and the logic module is disposed in a further process device separate from each of the set of process devices. However, each of the plurality of sensors may be disposed in a different one of a set of process devices and the logic module may be disposed in one of the set of process devices, such that the logic module is communicatively coupled to one of the sensors via an internal communication connection within the one of the set of process devices and is communicatively coupled to one or more of the other of the plurality of sensors via an external communication connection.

Additionally, the logic module may be coupled to one or more of the plurality of sensors via a process control protocol communication network, via a near field communications communication link, or via a radio frequency identification communication link, and may provide power to one or more of the non-intrusive sensors via a radio frequency communication link. The logic module may also include a further logic engine to detect a potential fault with one or more of the plurality of sensors based on, for example, a comparison of the sensor measurements from the plurality of sensors using the model. If desired, the model may be a principle component analysis model, a partial least squares model or any other type of empirical model.

The further physical process phenomenon may be a different type of physical process phenomenon than any of the physical process phenomenon measured by any of the plurality of sensors and each of the plurality of sensors may measure the same or a different type of physical process phenomenon. Moreover, the further physical process phenomenon may be the same type of physical process phenomenon measured by at least one of the plurality of sensors but may relate to the type of physical process phenomenon at a different location than the physical process phenomenon measured by the at least one of the plurality of sensors. Likewise, the further physical process phenomenon may be a different type of physical process phenomenon than the physical process phenomena measured by any of the plurality of sensors but may relate to the same physical location as the physical process phenomenon measured by at least one of the plurality of sensors. Also, if desired, two or more of the plurality of sensors may measure a different type of physical process phenomenon at the same physical location and/or two or more of the plurality of sensors may measure the same type of physical process phenomenon at different physical locations within the process.

Still further, the system may include a host device communicatively connected to the logic module to receive the determined value of the further physical process phenomenon, and the logic module may be communicatively coupled to one or more of the plurality of sensors using a first communication technique and may be communicatively coupled to the host device using a second communication technique that is the same as or different than the first communication technique.

In another embodiment, a method of determining a physical process parameter includes measuring a plurality of different physical process phenomenon within the process to produce a measurement value indicative of each of the physical process phenomenon, communicating each of the measurement values to a logic module via a communication link and processing, using a computer device, the measurement values with a model that relates each of the different physical process phenomenon to a further physical process phenomenon to determine a value of the further physical process phenomenon using the model and the sensor measurements. Thereafter, the method communicates the value of the further physical phenomenon to a host device as the physical process parameter.

In a still further embodiment, a process measurement system for use in a process includes a plurality of non-intrusive sensors to be disposed within the process, wherein each of the plurality of non-intrusive sensors measures a different physical process phenomenon within the process to produce a sensor measurement indicative a physical process phenomenon and includes a logic module disposed in a process device that is communicatively coupled to each of the plurality of non-intrusive sensors to receive the sensor measurements. Here, the logic module includes a logic engine and a model that relates measurements of the values of each of the different physical process phenomenon to a further physical process phenomenon, and the logic module operates on a computer processor device to determine a value of the further physical process phenomenon using the model and the sensor measurements. The system also includes a host device communicatively coupled to the logic module, a first communication network disposed between one or more of the plurality of non-intrusive sensors and the logic module and a second communication network disposed between the logic module device and the host device.

DETAILED DESCRIPTION

Generally speaking, a non-intrusive sensor system as described herein is able to measure or determine process phenomena that are impossible, difficult or expensive to measure directly due to, for example, the retrofitting needed to be made to process plant equipment to do so or because the process phenomena being measured are not directly measurable as such. Such a non-intrusive sensor system includes several input sensor devices, which may themselves be non-intrusive in nature, connected together via a logic engine that uses empirical data-based models to make a measurement of a further process phenomenon (also referred to as an output process phenomenon) not directly measured by any of the input sensor devices. In many cases the input sensor devices may be non-intrusive with respect to the process phenomena they are measuring as inputs to the logic unit of the non-intrusive sensor system and make measurements of different types of process phenomena to result in the output process phenomenon measurement or determination. This configuration may improve system performance and add redundancy.

Generally speaking, this sensor measurement approach is statistical and empirical in nature, as opposed to being deterministic. As the non-intrusive sensor system is an empirical system, the output of the non-intrusive sensor system may be determined in or expressed in qualitative terms such as "good/bad," "low/med/high," "safe/caution/danger," "approaching limit," "0-100%," etc. as opposed to being exact values (e.g., 90 degrees) expressed in, for example, engineering units, as is typically the case with intrusive sensors.

Non-the-less, empirically derived, qualitative measurements are of value as these measurements can still broadly enable a user to know that a process is operating correctly or that an undesirable condition exists or is about to exist. This approach may be used in addition to the highly deterministic measurements needed for closed loop control and safety shutdown logic typically used in process plants. Moreover, these empirically derived measurements may be easily determined by installing a large number of easily installed, for example, non-intrusive input sensors in a plant and coupling these sensors together via a logic unit that produces an empirically based estimate or measurement of an output process phenomenon based on the measurements made by the input sensors.

Figure 1:
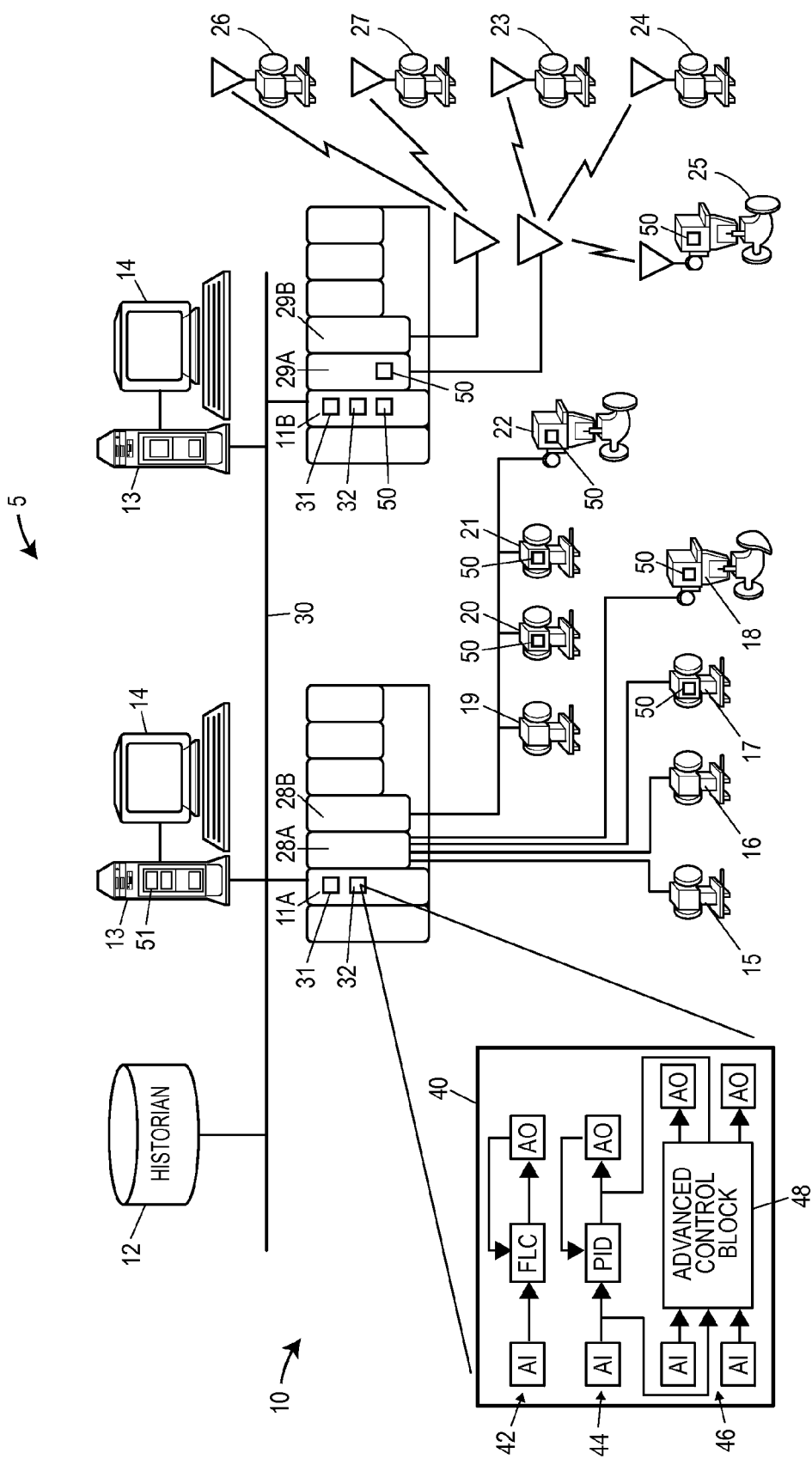
FIG. 1 is a diagram of a process plant network having user interfaces, process controllers and field devices, and a number of non-intrusive sensor systems disposed therein to measure one or more process phenomenon.

FIG. 1 illustrates an example industrial process plant 5 in which a non-intrusive sensor system may be installed and used. The process plant 5 includes an on-line process control system 10 having one or more process controllers (11A and 11B in FIG. 1) connected in a primary plant communications network to a data historian 12 and to one or more host workstations or computers 13 (which may be any type of personal computers, workstations, etc.), each having a display screen 14. The computers 13 may be associated with and run applications related to process control activities, maintenance activities, process configuration activities, business activities, etc. The controllers 11A and 11B are also connected to field devices 15-27 via input/output (I/O) cards 28A, 28B and 29A, 29B, and may operate to implement one or more batch runs of a batch process or may implement a continuous process using some or all of the field devices 15-27. The controllers 11, the data historian 12, the computers 13, the I/O devices 28 and 29 and the field devices 15-27, all of which are process control devices, process devices or process equipment, are communicatively coupled to a primary control communications network 30 also referred to herein as an on-line control network.

The data historian 12, which may be any desired type of data collection unit having any desired type of memory and any desired or known software, hardware or firmware for storing data, may be separate from (as illustrated in FIG. 1) or a part of one of the workstations 13. The controllers 11, which may be, by way of example, DeltaV® controllers sold by Emerson Process Management, are communicatively connected to the host computers 13 and to the data historian 12 via, for example, an Ethernet connection or any other desired communication line that is part of the communications network 30. The controllers 11A and 11B may be communicatively connected to the field devices 15-27 using any desired hardware and software associated with, for example, a standard 4-20 ma communications protocol and/or any smart communications protocol such as the FOUNDATION® Fieldbus protocol, the HART® protocol, the WirelessHART® protocol, etc.

In the system of FIG. 1, the controller 11A is illustrated as being connected via the I/O device 28A to 4-20 ma devices, or to HART devices 15-18 via standard wiring, such as wired HART communication lines. Likewise, the controller 11A is illustrated in FIG. 1 as being connected, via the I/O device 28B, to FOUNDATION® Fieldbus devices 19-22 via standard wired Fieldbus links or busses. Also, in the system of FIG. 1, the controller 11B is illustrated as being connected to WirelessHART® field devices 23-25 via the I/O device 29A and transmitters which implement a WirelessHART communication protocol while the controller 11B is connected to other field devices 26, 27 via any other wireless communication protocol, such as an IEEE process control based wireless protocol. However, the controllers 11 may communicate with any other number of and type of field devices using any other desired wired or wireless communication protocols or techniques. Of course, the field devices 15-27 may be any types of devices, such as sensors, valves, transmitters, positioners, etc. Even more particularly, the field devices 15-27 may include any type of process control component that is capable of receiving inputs, generating outputs, and/or controlling a process. For example, the field devices 15-27 may be in the form of control or process control input devices such as, for example, valves, pumps, fans, heaters, coolers, and/or mixers to control a process. Additionally, the field devices 15-27 may be in the form of process control output devices or transmitters such as, for example, thermometers, pressure gauges, concentration gauges, fluid level meters, flow meters, and/or vapor sensors that measure process variables associated with various different process phenomena within one or more portions of a process. The control input devices may receive instructions from the controllers 11 to execute one or more specified commands and cause a change to the process. Furthermore, the control output devices measure process data, environmental data, and/or input device data and transmit the measured data to the controllers 11 or other devices, such as maintenance devices, as process control or maintenance information. This process control or maintenance information may include the values of variables (e.g., measured process variables and/or measured quality variables) corresponding to a measured output from each field device. Also, the measured process variables may be associated with process control information originating from field devices that measure portions of the process and/or characteristics of the field devices. Measured quality variables may be associated with process control information related to measuring characteristics of the process that are associated with at least a portion of a completed product or an intermediate product.

Still further, the I/O cards 28 and 29 may be any types of I/O devices conforming to any desired communication or controller protocol. Also, while only two controllers 11A and 11B are illustrated in FIG. 1, any other number of controllers could be used to connect to and control any number of field devices using any desired communications protocols, such as Profibus, AS-interface, etc., protocols.

In any event, as is generally the case, the controllers 11A and 11B include processors 31 that implement or oversee one or more process control routines (stored in a memory 32), which may include control loops, and that communicate with the field devices 15-27, the host computers 13 and the data historian 12 to control a process in any desired manner. It should be noted that any of the control routines or modules described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, or function block diagrams, or using any other software programming language or design paradigm. Likewise, the control routines may be hard-coded into, for example, one or more EPROMs, EEPROMs, application specific integrated circuits (ASICs), or any other hardware or firmware elements. Thus, the controllers 11 may be configured to implement one or more control strategies or control routines in any desired manner.

In some embodiments, the controllers 11 implement one or more control strategies using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, neural network, etc., control, or an output function which controls the operation of some device, such as a valve, to perform some physical function within the process control system 10. Of course, hybrid and other types of function blocks exist. Function blocks may be stored in and executed by the controllers 11, which is typically the case when these function blocks are used for, or are associated with standard 4-20 ma devices and some types of smart field devices such as HART devices, or may be stored in and implemented by smart field devices themselves, which can be the case with Fieldbus devices.

As illustrated by the exploded block 40 of FIG. 1, the controller 11A may include a number of single-loop control routines, illustrated as routines 42 and 44, and, if desired, may implement one or more advanced control loops, such as multiple/input-multiple/output control routines, illustrated as control loop 46. Each such loop is typically referred to as a control module. The single-loop control routines 42 and 44 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other devices within the process control system 10. The advanced control loop 46 is illustrated as including inputs communicatively connected to one or more AI function blocks and outputs communicatively connected to one or more AO function blocks, although the inputs and outputs of an advanced control block 48 may be connected to any other desired function blocks or control elements to receive other types of inputs and to provide other types of control outputs. The advanced control block 48 may be, for example, any type of model predictive control (MPC) block, a neural network modeling or control block, a multi-variable fuzzy logic control block, a real-time-optimizer block, an adaptively tuned control block, etc. It will be understood that the function blocks illustrated in FIG. 1, including the advanced control block 48, can be executed by the controller 11A or, alternatively, can be located in and executed by any other processing device, such as one of the workstations 13 or even one of the field devices 19-22. As will be understood, the control loops or control modules 42, 44 and 46 may be associated with or used in implementing batch processes or continuous processes within the process control system 10.

Moreover, as illustrated in FIG. 1, one or more non-intrusive sensor systems 50 may be disposed at various locations within the plant 5 to measure or determine various process phenomena, such as temperature, pressure, fluid flow, fluid level, etc. within the plant. The various non-intrusive sensors 50 may be disposed in, or have components thereof disposed in various different process control devices, such as in various field devices 15-27 (such as valves, transmitters, etc.), I/O devices 28 and 29, controllers 11, workstations 13 and even the data historian 12. If desired, one or more of the non-intrusive sensors 50 could be a stand-alone device or could be implemented as multiple devices communicatively connected together using any of various types of communication networks described in FIG. 1, including for example wired and wireless communication networks, standard process control protocol communication networks, such as HART, WirelessHART, or Fieldbus communication networks, near field communication (NFC) networks, radio frequency identification (RFID) communication networks, Ethernet or wireless Ethernet communication networks, any internet protocol communication networks, etc. Moreover, the output of the various sensor systems 50 illustrated in FIG. 1 may be provided to any of the controllers 11 for use in one or more of the control routines 42, 44, 46, to any of the operator workstations 13 for use in a control or a maintenance application 51, or to any other user of that data.

Figure 2:
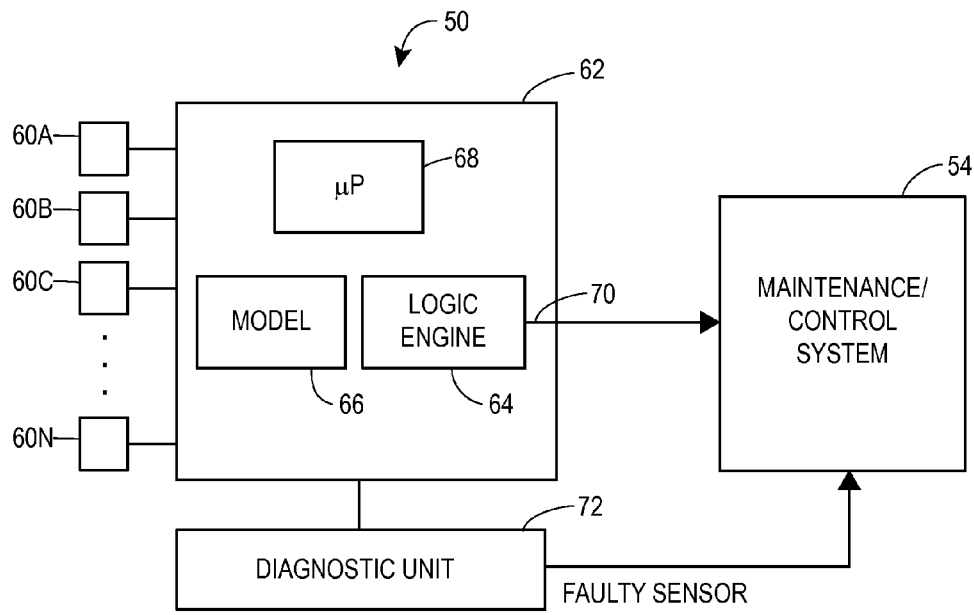
FIG. 2 is a block diagram illustrating an example of a non-intrusive sensor system.

Referring now to FIG. 2, a nonintrusive sensor system 50 is illustrated as being connected to a maintenance/control system 54, which may be or include, for example, any of the workstations 13 illustrated in FIG. 1 or other maintenance or control devices, such as controllers, I/O devices, handheld maintenance devices, etc., which might be connected to receive and use the output of a non-intrusive sensor system 50. The maintenance/control system 54 could be a maintenance or control application of any desired type stored in and implemented on any desired type of computer processing device, such as any of those described with respect to FIG. 1.

Generally speaking, the non-intrusive sensor system 50 includes a plurality of input sensors 60A-60N (also referred to herein as transmitters) coupled to a logic unit 62. Each of the plurality of input sensors 60A-60N measures a process phenomenon within the process, such as a temperature, a vibration, a pressure, etc., and produces a measurement signal indicative of a measured process variable or process phenomenon. Each of the plurality of sensors 60A-60N is a non-intrusive sensor, in that it does not measure the process phenomenon being determined by the analytic sensor 50 directly. However, if desired, one or more of the sensors 60A-60N may also be non-intrusive with respect to the process phenomenon they are measuring as inputs to the sensor 50 as, in this case, these sensors measure an input process phenomenon or process parameter non-intrusively with respect the process. Generally speaking, non-intrusive sensors may be connected within the process without touching or coming into direct contact with the process element, such as a process fluid, associated with or at the location at which a process phenomenon that is being measured exists, or without having to be installed within the process plant in a manner that requires shutting down or stopping the process flow in order to install the sensor.

In any event, each of the input sensors 60A-60N is non-intrusive with respect to the output process phenomenon being determined or measured by the sensor 50, as none of the input sensors 60A-60N will come into direct physical contact with the process element or process fluid exhibiting the particular process phenomenon ultimately being measured or determined by the sensor 50 to measure that physical process phenomenon. Any or all of the non-intrusive sensors 60A-60N may be, for example, temperature sensors, vibration sensors, flow sensors, heat sensors, flame detectors, or any other detector or sensor that senses some process phenomenon. Moreover, some or all of the plurality of input sensors 60A-60N may be configured to measure a process phenomenon at the same or different physical locations within a plant. Thus, for example, the sensors 60A-60N may each measure a different type of process phenomena, such as temperature, pressure, flame, etc., or one or more of the input sensors 60A-60N may measure the same process phenomenon at different locations within the plant, or even at the same location within the plant.

The sensors 60A-60N may generally be installed within the process plant at various different locations near or around the physical location at which a process phenomenon that cannot be measured directly, or that is not being measured directly, is exhibited so as to be estimated by the non-intrusive sensor 50. Thus, in some instances, the input sensors 60A-60N may be placed on a vessel to measure the temperature or moisture content or vibration of a vessel wall within which a fluid parameter is to be determined, such as a fluid level, fluid temperature, fluid pressure, etc. Still further, the input sensors 60A-60N may be disposed at various locations upstream and/or downstream of a location at which an output process phenomena is to be measured or determined by the sensor system. 50 In some cases, the input sensors 60A-60N may intrusively measure a particular process parameter, such as temperature or vibration of a vessel wall, by coming into contact with the vessel wall. However, in these cases, the sensors 60A-60N are still non-intrusive in that they do not intrusively measure the output process parameter or process phenomenon ultimately being measured by the sensor 50, e.g., the temperature, flow or pressure of the fluid within the vessel. Thus, the sensors 60A-60N could be sensors already installed in the plant for other purposes (such as any of the sensors within the field devices of FIG. 1) or could be installed in the process plant for the purpose of being used as part of an sensor system 50.

Moreover, as illustrated in FIG. 2, each of the input sensors 60A-60N is coupled to the logic unit 62, which may be in the same or in a different physical process device as one or more of the sensors 60A-60N. In some embodiments, the input sensors 60A-60N may be in communication with the logic unit 62 via one or more wireless communication networks, wired communication networks or lines, or any other type or nature of desired communication networks. In some cases, these communication networks may be the communication networks already established or set up in the process plant, such as any of the communication networks or lines of FIG. 1. In other cases, one or more of the input sensors 60A-60N may installed and use a separate communication network set up for or as a part of the sensor system 50. For example, the input sensors 60A-60N of a sensor system 50 may be connected in a wireless type of communication network with the logic unit 62 and may provide sensor measurements to the logic unit 62 via, for example, a near field communication (NFC) network, an infrared communication network, a radio frequency identification (RFID) communication network, a cellular communication network, a Bluetooth communication network, any typical RF communication network, a WirelessHART network, etc. In some instances, the logic unit 62 may power or provide power to one or more of the sensors 60A-60N via, for example, an RFID communication signal or a power signal delivered to the sensors 60A-60N via a wired communication network, such as a HART or a Fieldbus communication network.

As illustrated in FIG. 2, the logic unit 62, which receives the various sensor signals from the sensors 60A-60N via one or more sensor inputs, includes a logic engine 64 and a model 66. The logic engine 64 may execute on a processor 68, illustrated as part logic unit 62, to implement logic rules or a logic routine stored therein that uses the sensor measurements provided by the input sensors 60A-60N and the model 66 to develop an estimate of or a prediction of the current value or state of an output process phenomenon that is not measured directly by any of the input sensors 60A-60N. Such a process phenomenon could be the same type of process phenomenon, such as temperature, pressure, vibration, flow, heat, etc., as measured by one or more of the input sensors 60A-60N or could be a different process phenomenon. Moreover, the output process phenomenon determined by the logic unit 62 could be at the same or at a different location as the process phenomena measured by any of the input sensors 60A-60N. Thus, the input sensors 60A-60N could each measure the same type or a different type of process phenomenon than that estimated or produced by the logic unit 62 at the output thereof, or some of the input sensors 60A-60N could measure the same type of process phenomenon as being estimated or produced by the logic unit 62 while other of the sensors 60A-60N could measure different types of process phenomena as the process phenomenon being produced or estimated by the logic unit 62. In any event, the logic engine 62 takes the sensor measurements and, using the previously generated model 66, produces an estimate of the output process phenomenon and provides this estimate or measurement to an output 70 of the logic unit 62. The logic unit 62 may be coupled to the maintenance/control system 54 via a wired or wireless communication network or any other type of communication network, including the network that uses typical process-control communication protocols, such as HART, Wire-lessHART, Fieldbus, Profibus, etc., communications protocols, an Ethernet network, an internet protocol based communication network, etc.

As an example, a non-intrusive sensor system may use, as one or more input sensors, a valve position indicator that does not require physical contact between the positioner and the valve stem and a vibration sensor that is used to indicate presence of steam flow through a steam trap. These two devices may work together by sending their information to a logic unit or logic solver that uses the inputs to infer fluid flow. Here, as long as both measurements are within their instrument range, a flow rate may be empirically ascertained, by making a comparison of the input measurements to a model stored in the logic solver. While this analytic comparison to an empirical model approach will work with one measurement, it just will not be as robust or as high performance. Adding measurements and comparing them to the empirical model will improve system performance. For example, a temperature sensor measurement could be added to the system described above, and flow could be inferred or determined from a three dimensional model surface.

Thus, generally speaking, the model 66 illustrated in FIG. 2 is predetermined beforehand based on collected process data from an operating process or in a laboratory setting, wherein the data is used to define a relationship between the output process phenomenon being measured or determined by the sensor system 50 and the various input process phenomenon measured by the input sensors 60A-60N. In this manner, the logic unit 62 uses an empirical model 66 and the inputs from the sensors 60A-60N to estimate the output process phenomenon or the estimated process phenomenon, that is not measured directly or intrusively by any of the sensors 60A-60N. In some instances, however, it will be understood the that process phenomenon being estimated or produced by the sensor system 50 may be measured indirectly or non-intrusively by one or more of the sensors 60A-60N.

As will be understood, virtually all process monitoring and control today is performed based upon deterministic mathematical models. For example, the equation used for flow measurement based upon differential pressure is provided below to give an example of a deterministic process flow system. This equation can be derived from first principles using the continuity equation (conservation of mass)

$$Q_m = \rho_1 A_1 v_1 = \rho_2 A_2 v_2$$

And the Bernouli equation (conservation of energy):

$$P_1 + \tfrac{1}{2}\rho v_1^2 + \rho g h_1 = P_2 + \tfrac{1}{2}\rho v_2^2 + \rho g h_2$$

Combing these two equations yields the flow equation below:

$$Q_{mass} = N C_d Y_1 E d^2 \sqrt{DP(\rho_f)}$$

Where $Q_m$ = Mass flow rate
N = Units conversion factor
$C_d$ = Discharge coefficient
$Y_1$ = Gas expansion factor
    (ISO standard uses expansibility factor, $\varepsilon$)
E = Velocity of approach factor = $1(1-\beta^4)^{1/2}$
d = Bore of differential producer
DP = Differential pressure
$\rho_f$ = fluid density at flowing conditions
$\beta$ = Beta ratio (d/B)

Of course, this is but one example of a deterministic measurement system, and other flow measurement technologies use a similar approach in that they use a fundamental principle of physics to make a measurement (e.g., resistance of a wire to measure temperature, the relationship between dimensionless flow numbers for vortex flow measurement, capacitance change in certain level measurements, etc.) In these cases, the ability to directly measure the parameter of interest is the main determinant of measurement performance.

Empirical models such as the model 66 of FIG. 2, however, are based mostly or entirely on collected data. Thus, and important distinction between empirical models and the deterministic examples provided above is that the empirical models are not derived from assumptions concerning the relationship between variables, and they are not based on mathematically expressed physical principles. The empirical model is, instead, developed using experience and observation. A systematic approach to model development in a process control or a monitoring setting makes observations in a laboratory setting or even in an operating process plant based on the configuration to be used in a non-intrusive sensor system, and develops a data set. Mathematical techniques can then be used to correlate the data set to a parameter of interest, i.e., the parameter being determined by the non-intrusive sensor system. The data set could also be developed in the field by an astute observer of the relevant data. In either case, no assumptions are made on underlying physical principles.

Figure 3:
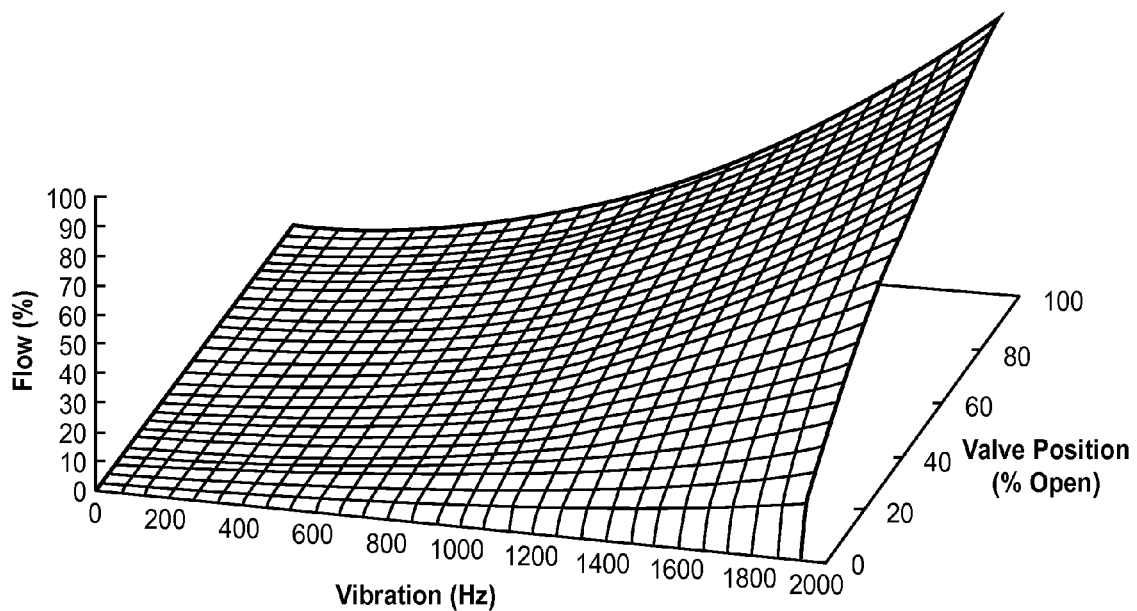
FIG. 3 is a depiction of a model used in the non-intrusive sensor system of FIG. 2.

FIG. 3 illustrates an example model that may be used as the model 66 by the logic unit 62. In this case, the model 66 is a three dimensional model that relates or maps the output values of two sensor measurements, such as those produced by non-intrusive sensors 60A and 60B, to produce a temperature determination or signal. In this case, the two input sensor measurements, in the form of valve position (percent open) and vibration (in terms of hertz), are used to estimate the fluid flow (in percent) through a valve or other line connected to the valve. As will be understood, the three-dimensional model of FIG. 3 illustrates a valve-flow percentage associated with each combination of vibration and valve position measurements. In this example, data is thus collected by the non-intrusive sensor system on valve position and pipe vibration, and this data is then correlated to flow using an empirical model.

As will be understood, the logic engine 64 of FIG. 2 may use the model 66 of FIG. 3 to determine the current valve-flow based on the measurements made by the valve position and the vibration sensors (which are all or part of the sensors 60A-60N). Of course, the model 66 of FIG. 3 is but one possible example of a model that may be used to perform process phenomena variable or process variable estimation within the non-intrusive sensor system 50, there being many other types of models that could be used, including, for example, principal component analysis (PCA) models, regression analysis based models, partial least squares (PLS) models, etc. More particularly, the model 66 will generally be established based on measured data relating the various values of the sensors 60A-60N to the value, range or state of the process phenomenon being measured or determined by the sensor system 50. The measured data, in effect, defines the relationship between one or more variable measurement values with respect to the variable or process phenomenon being estimated.

Of course, this empirical model based sensor approach is not limited to determining the process phenomenon of fluid flow, and other systems can be implemented that use this same concept to measure level in a tank (using, for example, a load cell and several infrared temperature sensors), corrosion, or any other process phenomenon.

Still further, additional information can be gained by comparing sensor signals from the input sensors 60A-60N of the sensor system 50. For example, if one of the measurements of one of the sensors 60A-60N is out of range and another is in range, it may be ascertained that the out of range instrument is in a fault condition. To take advantage of this concept, the sensor system 50 of FIG. 2 is illustrated as including a diagnostic unit 72 that may be used to detect an error or fault in one or more of the input sensors or measurement devices 60A-60N. In particular, the diagnostic unit 72 may compare the different values of the sensor measurements with each other and/or may use other types of information about sensor measurements 60A-60N, to determine whether any of the sensors 60A-60N is faulty or working improperly. As an example, the diagnostic unit 72 (which may be implemented as software executed on the processor device 68) may detect when one or more of the sensor measurements from the input sensors 60A-60N is out of range or in an a non-typical range when compared to the values of one or more of the other sensor measurements from one or more other sensors 60A-60N. The diagnostic unit 72 may then determine, based on this observation, that the out of range sensor is faulty. More particularly, when the model 66 is developed, the sensor data collected to develop the model (i.e., the relationship between the various sensor measurements of the sensors 60A-60N and the output process phenomenon) may be analyzed to determine relationships between two or more of the sensors measurements from the sensors 60A-60N themselves. Thus, for example, it may be determined that the temperature being measured by one of the input sensors 60 is typically or always less (in terms of measurement range or percent) than the vibration measurement from another of the input sensors 60, or that the temperature measurement typically hits a maximum value when a pressure measurement from a third input sensor 60 is above 50 percent of the measured pressure range. In these cases, a detected deviation of the temperature measurement (delivered from an input temperature sensor) from one or more these relationships may lead to the diagnostic unit 72 detecting that the temperature sensor is faulty and needs to be repaired or replaced. In another embodiment, the diagnostic unit 72 may use any of the faulty sensor detection methods disclosed in U.S. Pat. No. 5,680,409 entitled "Method and Apparatus for Detecting and Identifying Faulty Sensors in a Process," the entire disclosure of which is hereby expressly incorporated herein by reference. In any event, the diagnostic unit 72 may operate in parallel with the logic engine 64 and the model 66 to produce a faulty sensor indication, which may also be provided to the maintenance/control system 54 and be used in any desired manner.

Still further, as will be understood, the logic unit 62 and the diagnostic unit 72 of the sensor system 50 may be communicatively coupled to the maintenance/control system 54 using any desired communication technologically, including wired or wireless communication networks. In fact, the communications between the input sensor devices 60A-60N and the logic solver 62 may be wireless or wired. In the case of wireless connections, the distances will be short for many uses. This feature enables the use of communication methods/technology such as RFID in which the logic unit 62 may be set up to provide power to the measurement devices 60. Of course, communications from the logic unit 62 to the host system may be wireless (e.g., using a WirelessHART network, a wireless internet network) or may be wired using, for example, conventional twisted pair wired techniques, such as those associated with 4-20 mA, HART, Modbus, Foundation Fieldbus, Profibus or other known process control protocols.

Figure 4:
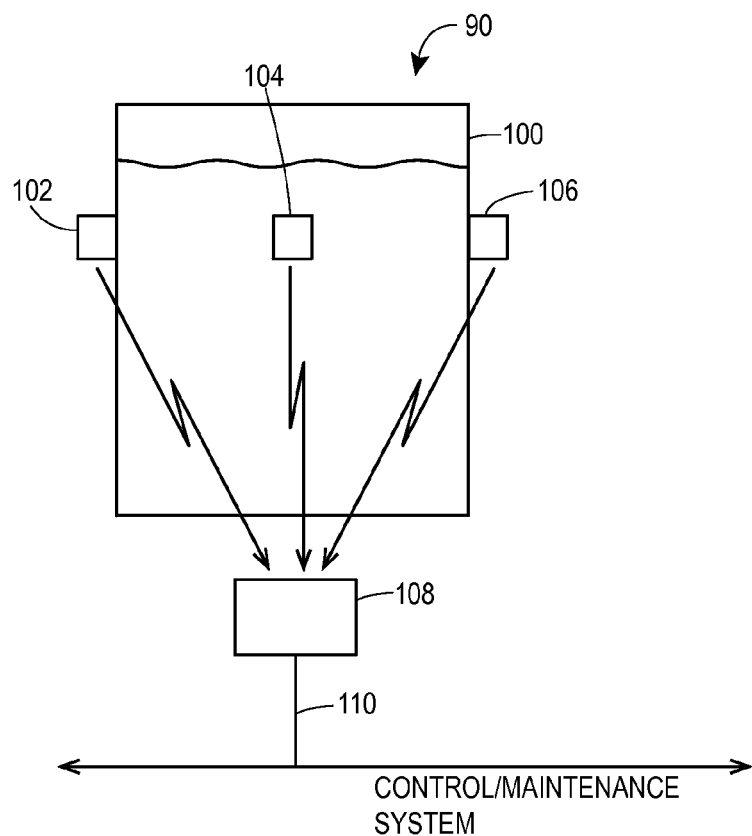
FIG. 4 is a block diagram illustrating an example non-intrusive sensor system of FIG. 2 implemented in a first configuration to non-intrusively measure a particular output process parameter in a process plant.

FIG. 4 illustrates one example process plant 90 or portion of a process plant 90 having a non-intrusive sensor system 50 installed and operated therein. In particular, the plant 90 of FIG. 4 includes a tank 100 having three non-intrusive input sensors in the form of a vibration sensor 102, a temperature sensor 104, and a valve position sensor 106 installed thereon. The vibration sensor 102 may measure the vibration of a wall of the tank 100, the temperature sensor 104 may measure or be connected to measure the temperature of the wall of the tank 100 at a particular location and a valve position sensor 106 may be installed to measure the operation of a valve such as detecting a valve closure element position. As illustrated in FIG. 4, each of the sensors 102, 104 and 106 is communicatively coupled to a logic engine 108 via, for example a wireless communication network. In this case, the logic engine 108 is stored in a memory and executed on a processor of a further process control device, such as an I/O device, another field device such as a valve, a process controller, etc. Moreover, the logic engine 108, which receives the measurements from the sensors 102, 104 and 106, includes a model 109 for use in determining the pressure of the fluid within the tank 100 based on the vibration, temperature and valve position measurements made by the sensors 102, 104 and 106, respectively. The logic engine 108 operates to produce an estimate of, for example, the pressure within the tank 100, using the model 109 designed for that purpose. The output of the logic unit 108 is communicatively connected to a control system and/or to a maintenance system via a communication network 110 which is illustrated as a wired communication network, but could instead be a wireless communication network. Of course, the sensors 102, 104, and 106 could be any of the field devices of FIG. 1, the logic unit 108 could be within any of the devices of FIG. 1 and the communication networks between the sensors 102, 104 and 106 and the logic unit 108, or between the logic unit 108 and the host devices could be any of the communication networks described in FIG. 1. In one case, the sensors 102, 104 or 106 may measure a process control parameter used to control the process and may also measure one or more secondary physical phenomena, wherein one or more of the secondary physical phenomena is/are the measured physical phenomena sent to the logic module 108. In other cases, the measured process control parameter may be the measured physical process phenomenon sent to the logic module 108.

Figure 5:
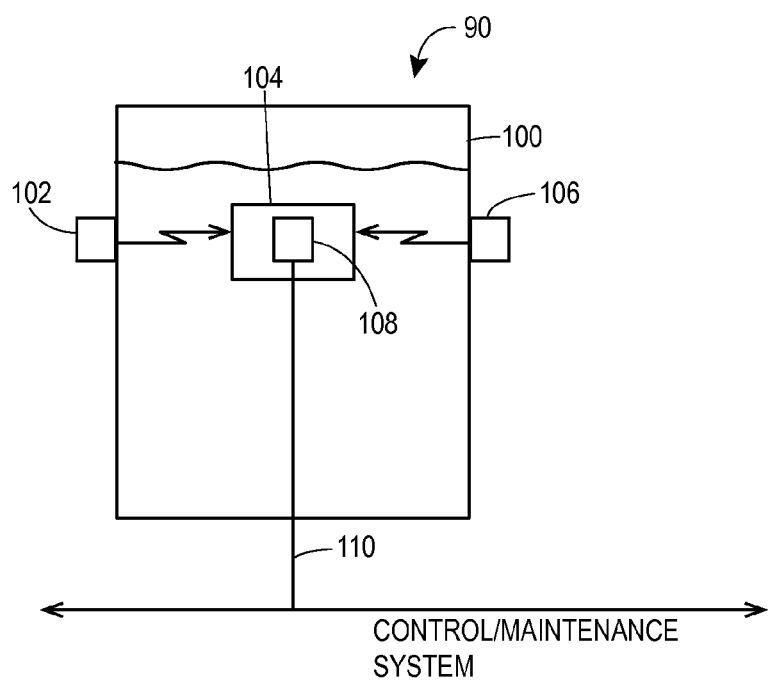
FIG. 5 is a block diagram illustrating an example non-intrusive sensor system of FIG. 2 implemented in a second configuration to non-intrusively measure a particular output process parameter in a process.

As a further example, FIG. 5 illustrates a non-intrusive sensor system in which the sensors 102, 104 and 106 or are similarly disposed on the tank 100. However, in this case, the logic unit 108 is disposed within one of the sensors devices, in this case the sensor device 104. Here, the sensors 102 and 106 are communicatively coupled with sensor 104 via, for example, a wireless communication network, and provide their measurements to the logic engine 108 via these communication networks, while the sensor 104 provides its measurement to the logic unit 108 via an internal communication connection. In this case, the logic unit 108 may be connected via a primary process control communication network, a secondary communication network, etc. to a process control system via the communication line 110. The communication line or network 110 may be, for example, a wireless or a wired process control communication network or any other desired type of network. Of course, any number and type of sensors could be used in non-intrusive sensor systems FIGS. 4 and 5, and the particular sensors and logic units of these systems could be configured and connected together in various different manners to implement the sensor techniques described herein.

Figure 6:
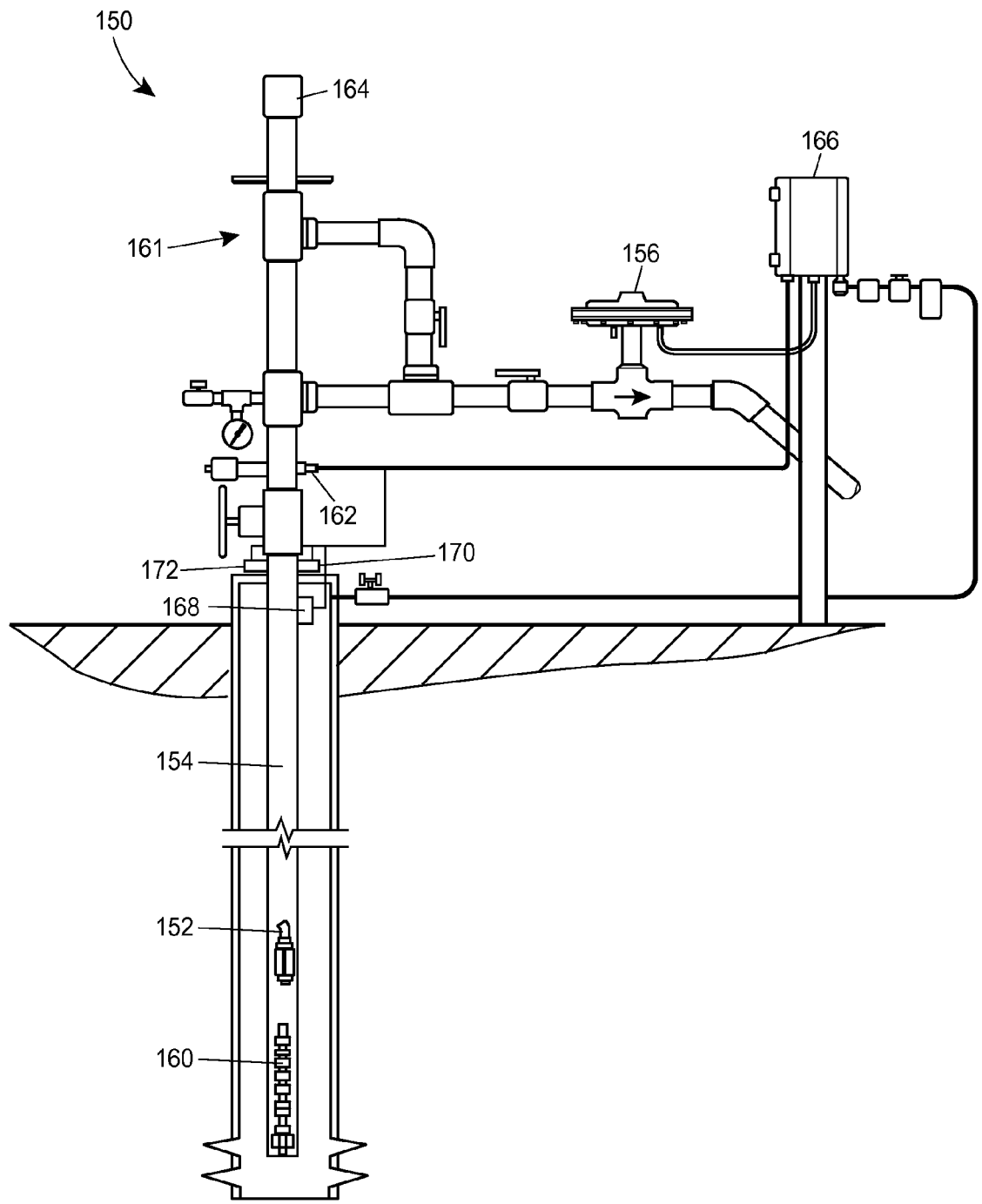
FIG. 6 depicts a gas well plunger control system including a non-intrusive sensor system.

As another more specific example, FIG. 6 depicts system that uses an array of intrusive and/or non-intrusive sensors as part of an analytical sensor that provides a measurement of a particular process variable or phenomena based on a model related to the sensor measurements. In particular, the system of FIG. 6 relates to plunger lift technology commonly used in natural gas wells to increase production. As background, when water naturally builds up on the bottom of a gas well, the flow of gas from the well slows down, eventually stopping completely. A plunger lift system is typically provided within the gas well to remove water from the bottom of the well (and thus increase gas flow from the well) by removing the water from the well bore. More specifically, the plunger lift system forces a plunger to traverse from the bottom of the well to the top of the well, which then forces the water within the well bore to the top of the well where this water is expelled from the well bore, thereby enabling gas to flow from the well at a higher rate.

Typically speaking, plunger lift systems measure the gas flow and the pressure of the well, and operate to regulate the opening and closing of a motor valve, which in turn controls the falling and rising of the plunger. When gas flow decreases to a certain point, the motor valve closes, causing a plunger to fall through the water to the bottom of the well. When pressure builds up sufficiently, the motor valve opens again, allowing the built-up pressure to push the plunger back up to the well head, pushing out the water ahead of the plunger. Optimal efficiency in the gas well production requires knowledge of when the plunger hits the bottom of the well so as to be able to start the plunger moving towards the top of the well as soon as possible, while also assuring that the plunger goes to the bottom of the well prior to starting the ascent of the plunger. Generally speaking, abnormalities in the pressure measurement at the well head are known to correspond to specific events during the plunger fall (e.g., the plunger hitting the surface of the water or the bottom of the well).

More particularly, when a new natural gas well first begins its operation, gas typically flows freely from below ground to the surface, aided by a high pressure usually present in the reservoir. However, before long water begins to flow into the bottom of a gas well. The resulting backpressure of the water column, coupled with a decrease in the reservoir pressure results in the flow of natural gas slowing down, and eventually stopping completely. One common solution to this problem is to use a plunger system to lift the water out of the well. FIG. 6 illustrates a typical gas well 150 with a plunger lift system having a plunger 152, which is a device having approximately the same diameter as the center tubing of the well and that freely moves up and down a well bore 154. A motor valve 156 is used to open and close the well 150, causing the plunger 152 to travel to the top or bottom of the well 150, as described later. A bumper spring 160 is located at the bottom of the well 150 to prevent damage to the plunger 152 when the plunger 152 hits the bottom of the well 150. Moreover, a catcher 161 and arrival sensor 162 are disposed at the top of the well 152 and operate to catch the plunger 152 when the plunger 152 comes to the top of the well 150. The arrival sensor 162 generates an electronic signal indicating the arrival of the plunger 152. A lubricator 164 is disposed above the catcher 161 and operates to apply an oil or other lubricant to the plunger 152 to ensure that plunger 152 will move through the tubing freely. An electronic controller 166 operates the well 150 by receiving available measurement signals (e.g. tubing pressure from a tubing pressure sensor 168 and plunger arrival from the sensor 162), and by sending commands to the motor valve 156 to open and close at the appropriate times.

During operation, water builds up at the bottom of the well 150 and, as more and more water builds up at the bottom of the well 150, less and less natural gas flows out of the well 150. During this time, the plunger 152 is held up near the lubricator 164 by the pressure of the gas flowing. After the gas flow drops below a certain limit, the controller 166 closes the motor valve 156, shutting off the flow of gas, and in turn causing the plunger 152 to fall down the well tubing or well bore 154. The plunger 152 typically falls through the air in the tubing for a while, before the plunger 152 hits the water in the well bore 154. Additionally, the plunger 152 typically falls much faster through the air than through the water. The plunger 152 generally has some sort of check valve, or other specially engineered seal that allows it to fall freely through the water, while at the same being time be able to push the water back to the surface.

Eventually, the plunger 152 hits the bumper spring 160 at the bottom of the well 150. Here, the amount of time that a plunger 152 sits on the bottom of the well 150 needs to be minimized, because a gas producer wants to have the well 150 return to full production as soon as possible. After the well 150 has been shut in (referred to as the shut in period) for a certain length of time (long enough for the plunger 152 to reach the bottom) the controller 166 opens the motor valve 156, and the internal pressure of the well 150 pushes the plunger 152 back to the top. As the plunger 152 travels back to the top of the well 150, the plunger 152 pushes a slug of water ahead of it. After the plunger 152 reaches the top, and the water is removed, and the natural gas again flows freely. Gas will flow freely until water again accumulates at the bottom of the well 150, at which point the plunger cycle starts over.

Because a gas producer may operate thousands of wells, the instrumentation and control on any given well is typically very minimal. Sometimes the only measurements that may be on the well 150 are two absolute pressure transmitters, one measuring the tubing pressure 168 (the center tube through which the plunger 152 falls, and through which gas normally flows) and the other measuring the casing pressure (also called the annulus—an outer void containing the tubing). In some cases, only one or neither of these sensors may be provided. There is also at minimum the motor valve 156, which opens and closes to control the plunger 152 falling to the bottom of the well 150, or coming to the top of the well 150, and the electronic controller 166, which may be a programmable logic controller (PLC) or remote operator console (ROC). The controller 166 receives the available measurement signals, and opens and closes the motor valve 156 at the appropriate time, in order to keep the well operating optimally. Sometimes there may also be a plunger arrival sensor 162 (which senses when the plunger 152 reaches the well head) or a temperature measurement sensor or flow sensor which measures the flow rate of the gas. Whichever of these measurements are present, they are all measurements made at the top of the well. There is no permanent instrumentation or measurement within or at the bottom of a well. Thus, the controller 166 needs to perform the plunger cycle control based only upon these measurements at the well head.

One of the important aspects of gas well control with plunger lift technology is that the well 150 must be shut in for an appropriate length of time. It is very critical is that the well 150 be shut in long enough for the plunger 152 to reach the bottom. If the plunger 152 does not get all the way to the bottom, then when the motor valve 156 is opened, not all of the water will be removed, and the well 150 will not return to optimal production. In this case, the time that it took for the plunger 152 to fall and return (which could be 30 minutes to a couple of hours) will have been wasted. Even more critical is that, if the motor valve 156 is opened before the plunger 152 hits the water, the plunger 152 will not be slowed by the water and will come up the well bore 154 at a very high speed, caused by the large pressure within the well 150, which may damage the plunger 152 or the catcher 161 or lubricator 164, or even blow the catcher 161 completely off the well head.

Because of the danger of bringing the plunger 152 back up too early, most well control strategies have a built-in "safely factor." These systems will thus shut in the well 150 long enough for the plunger 152 to reach the bottom, plus some additional time, just to ensure that the plunger 152 does in fact always reach the bottom. The disadvantage here is that time that the plunger 152 sits on the bottom of the well 150 is time that the gas well 150 is not producing. The longer the plunger 152 sits on the bottom, the longer it will be before the gas well 150 can return to full production.

To solve this problem, a non-intrusive sensor system as described above may use one or more non-intrusive sensors alone or along with one or more of the pressure sensors such as the pressure sensor 168 of FIG. 6 to detect when the plunger 152 hits the bottom of the well.

Figure 7:
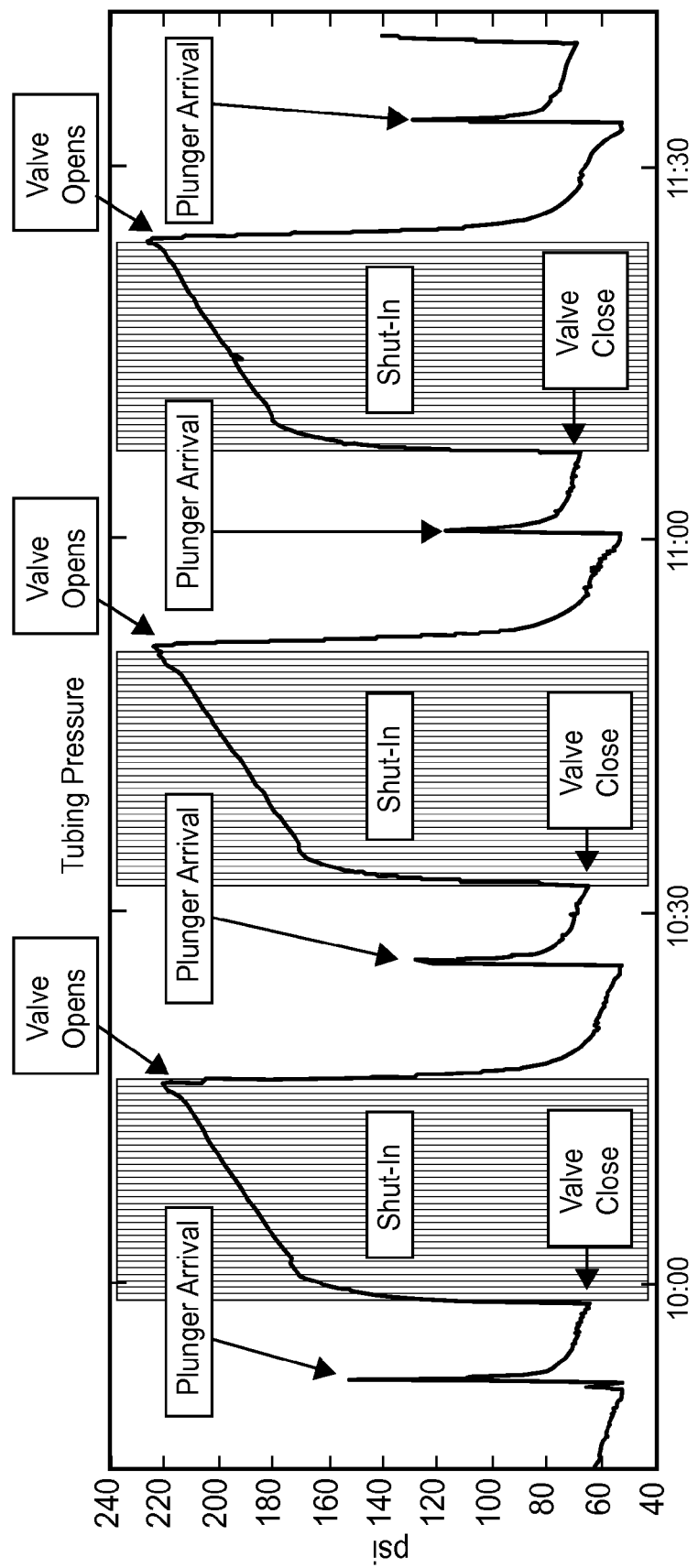
FIG. 7 illustrates a plot of tubing pressure within a well bore of the gas well of over three plunger cycles of the plunger control system of FIG. 6.
Figure 8:
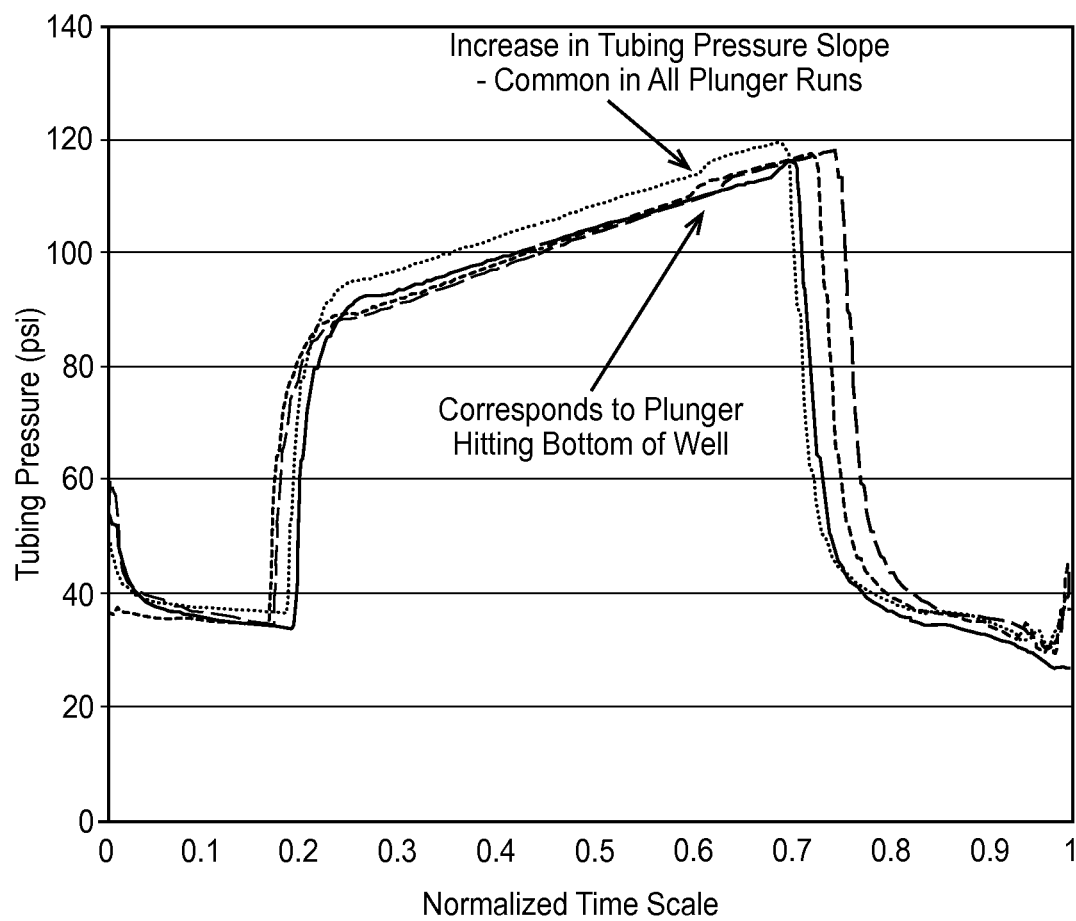
FIG. 8 illustrates a plot of tubing pressure of various plunger cycles on a common scale.
Figure 9:
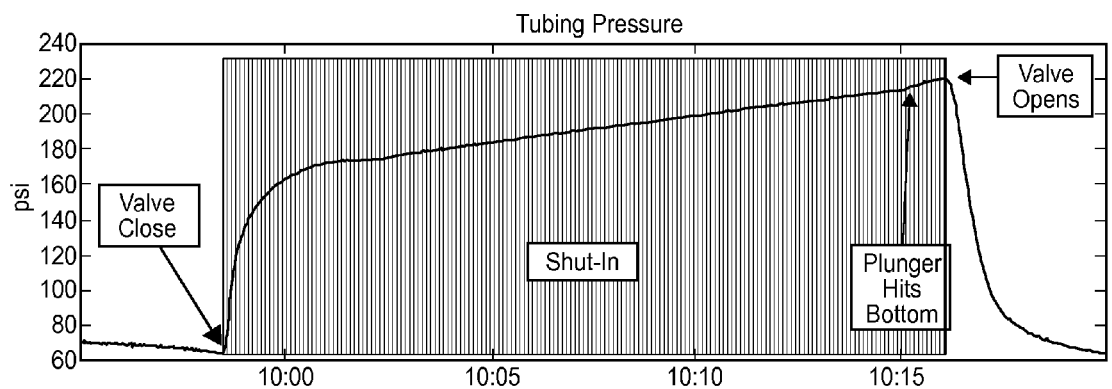
FIG. 9 illustrates a plot of tubing pressure in a shut-in period of a plunger cycle implemented in the control system of FIG. 6.

As illustrated in FIG. 7, a plot of the pressure measurement from the pressure sensor 168 generally indicates various different times or stages associated with the operation of the plunger 152. In particular, the chart of FIG. 7 illustrates a trend of the tubing pressure measured at the well head over three plunger cycles. The arrows in FIG. 7 label the points in the plunger cycle that are normally known, i.e., when the plunger 152 arrives at the well head, when the motor valve 156 is closed, and when the motor valve 156 is opened. The shut-in period (which is the time of the plunger 152 falling plus the time that the plunger 152 rests on the bottom) is the time between when the motor valve 156 closes, and when it opens again. FIG. 8 illustrates a plot the pressure within the well tubing during multiple plunger cycles on a normalized time scale. As will be seen in this graph, each of the plunger cycle plots includes is a small uptick (increase in the slope) of the pressure shortly before the motor valve 156 opens (and the tubing pressure begins to decrease). This uptick corresponds to when the plunger 152 hits the well bottom. In a similar manner, FIG. 9 illustrates a plot of the tubing pressure data for one shut-in period, and indicates that the tubing pressure data additionally includes a small uptick in the pressure when the plunger 152 hits the bottom.

Figure 10:
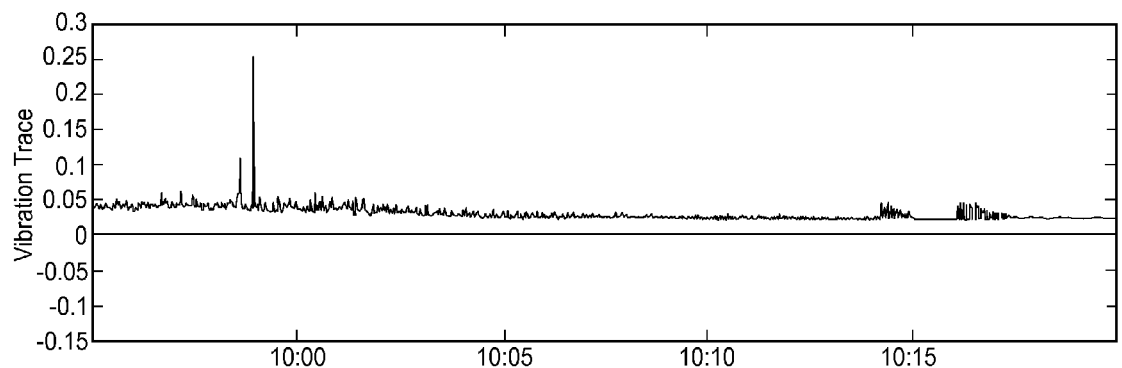
FIG. 10 depicts a plot of a vibration measurement that could be made by a non-intrusive vibration sensor used as part of the non-intrusive sensor system of FIG. 6.
Figure 11:
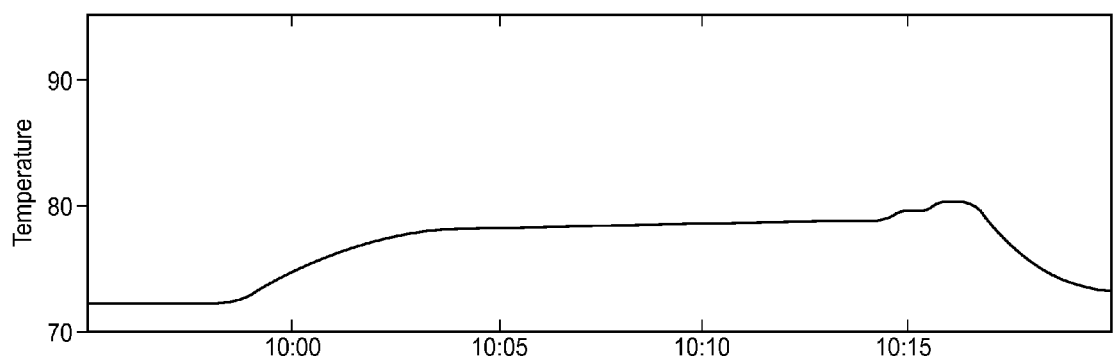
FIG. 11 depicts a plot of a temperature measurement that could be made by a non-intrusive temperature sensor used as part of the non-intrusive sensor system of FIG. 6.

However, it may be difficult to detect this small uptick, alone, within the tubing pressure data to detect the arrival of the plunger 152 at the bottom of the well. However, adding additional non-intrusive sensors to the system to create a sensor in the manner described above provides for a more robust sensor that is capable of more accurately detecting the arrival of the plunger 152 at the bottom of the well 150. As indicated in FIG. 6, for example, a vibration sensor 170 could be added to the top side of the well 150 to capture vibration in the well casing and a surface temperature sensor 172 could be added to the exterior of the well casing to indicate flow of product (e.g.,) gas. FIGS. 10 and 11 provide plots of an example vibration sensor measurement and a temperature sensor measurement, respectively, which may be measured by such measurement devices. As generally explained above, the correlation of these measurements with the tubing pressure measurement described above or as illustrated in FIGS. 8-10 may provide for the creation of a robust analytic model that is able to predict or better measure the physical phenomenon in this case, i.e., the arrival of the plunger 152 at the bottom of the well 150, which would then allow the controller 166 to immediately open the motor valve 156 to allow the flow of gas and the plunger 152 back up the well 150 to end the shut in period of the well 150 as quickly as possible. It should be noted, in this case, that the plots of FIGS. 10 and 11 are not illustrative of actual measured temperatures and vibrations in a plunger lift system, but are simply estimates of such measurements. In any event, based on the measurements made by the pressure sensor 168 (which may be an intrusive sensor), and the vibration sensor 170 and temperature sensor 172 (which are non-intrusive), a non-intrusive sensor system disposed in the controller 166 may operate to provide a robust and accurate detection of the arrival of the plunger 152 at the bottom of the well 150. Alternatively, other types of sensors may be used as the non-intrusive sensors including, for example, acoustic sensors. Likewise, in cases in which the well 150 does not include a pressure sensor 168 within the tubing to measure tubing pressure directly, the non-intrusive sensor system described herein could include various non-intrusive sensors (such as vibration, acoustic, temperature, etc. sensors) disposed outside of the pressure boundary of the well bore 154 that are combined as a non-intrusive sensor system in the manner described herein to determine the pressure in the well bore 154.

Of course, as will be understood, the development of the empirical model to be used in the logic engine of a non-intrusive sensor system is critical, because the empirical model is needed to convert the sensor measurements produced by the input sensors into an estimate of the process phenomenon being measured or determined by the non-intrusive sensor system. In a general sense, the model is an empirical model in that this model is based on data collected for a process to define relationships between the various measured parameters and the parameter or process phenomenon being determined by the non-intrusive sensor system.

Figure 12:
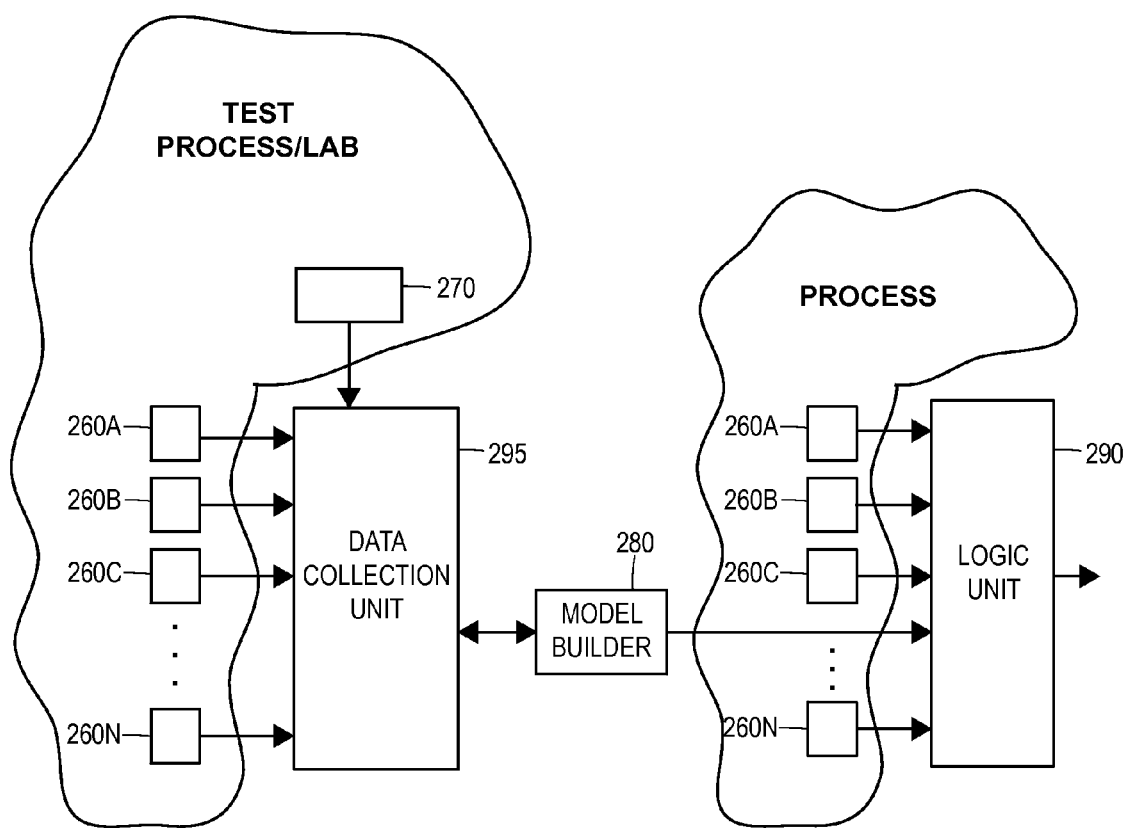
FIG. 12 is a data flow diagram illustrating the development of an analytic model to used within the non-intrusive sensor system of FIG. 2 within a process plant or a laboratory environment.

FIG. 12 illustrates methods of generating such a model. As illustrated on the left side of FIG. 12, the model may be developed by first placing data-capture devices 260A-260N (i.e., sensors) within a functioning or operating process environment, wherein the data capture devices or sensors measure process phenomena of the type and at locations that are predetermined to be, or at least believed to be relevant to (correlated in some manner) with an estimate of the output process phenomena trying to be measured. Thereafter, the process is operated in a manner that changes the process phenomenon to be estimated or determined by the non-intrusive sensor system for which the model is being developed, and the input and output process phenomena data is collected within the system. Here, sensor values from the installed sensors 260A-260N are collected and stored to measure the input process phenomena, as well as data or measurements pertaining to the output process phenomenon to be determined by the non-intrusive sensor system. The output process phenomenon may be measured directly by an installed sensor 270, or may be measured or determined off line, such as by taking process fluid samples and analyzing these samples in a laboratory. Thus, the measurements of the output process phenomenon to be determined by the non-intrusive sensor system may be measured directly, such as with a temporarily installed sensor, or may be measured indirectly, such as by calculations or other measurements based on the output of the process or a later-determined laboratory measurement from the process.

In any event, when all of the data is collected, a model builder application 280 is used to generate a model using the collected data from the various sensors. This model is then provided to and stored in a logic unit 290. Thereafter, the logic unit 290 may be operated to produce an estimate of the output process phenomenon being measured based on the sensor measurements that are taken non-intrusively with respect to the output process phenomenon being determined by the non-intrusive sensor system.

In another case, the model may be developed in a laboratory environment instead of in an operating plant. In this case, the laboratory environment may be set up to be similar to the process environment, but can be operated under very controlled conditions. The laboratory equipment may then be used to change the values of the output process phenomenon being determined by the non-intrusive sensor system, to measure or collect those values as well as the values for the input sensors, and this data may then be used to create and store the model. In any event, in many cases, a laboratory environment will be a better environment in which to develop a model because the laboratory equipment typically can be controlled more closely, and is typically more accessible and thus easier to use in a manner that is able to capture measurements of the input and outputs of the non-intrusive sensor system over the desired operating ranges of these sensors and the process.

Again, referring to FIG. 12, a data-capture unit 295 is connected to various online non-intrusive sensors, either in a laboratory environment or in a process environment. Here, the data capture unit 295 is connected to the various sensors 260A-260N which collect model input data and to one or more sensors 270 that measure or determine the output process phenomenon. A process controller (not shown in FIG. 12) of the process may control the process to cycle or go through various ranges, or through various different stages or states so as to drive the output process phenomenon through its normal range of values expected to be encountered during actual operation of the process. During this time, the input and output sensors collect and time stamp data, which data will be used to determine the input/output relationships of the model. Thus, generally speaking, during this time, the process may be upset in various different manners via one or more control routines, which causes a process fluid or process to go through various different states, stages or operating conditions, which will produce a robust set of input and output data for use in building the model. If desired, the process may be controlled to cause the various different input measurements to change over their possible ranges as well. In any event, after process has been cycled through the various stages or states, and the input and output data is captured for various different values of the output process phenomenon to be measured, the model creation or builder routine 280 uses the captured data, including the captured input and output data, to produce the model. The model is then provided to the logic unit 290 within the plant to be run and operated as described above in more detail.

Using the above described techniques, a non-intrusive sensor system may be easily installed within a plant, such as by installing non-intrusive sensors at various locations within or near the process variable or process phenomenon to be measured by the non-intrusive sensor system, coupling these sensors to a logic engine, and then using a predetermined model to produce an empirical estimate of the phenomenon being measured by the non-intrusive sensor system. Such non-intrusive sensor system, while being slightly more complex, may be more robust, and is easier to install because it typically will not require a shutdown of the process, or intrusion into or disposal within the process of various sensors that are hard to position or locate within the process. Instead, the non-intrusive system sensor may be have its sensor elements disposed at various accessible locations to measure phenomena that are correlated in some manner with the ultimate process phenomenon being measured, and may make such measurements non-intrusively.

At least some of the above described example methods and/or apparatus may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as a magnetic medium (e.g., a magnetic disk or tape), a magneto-optical or optical medium such as an optical disk, or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification describes example methods, systems, and/or machine-accessible medium, the examples are not the only way to implement such systems, methods and machine-accessible medium. Therefore, although certain example methods, systems, and machine-accessible medium have been described herein, the scope of coverage of this patent is not limited thereto.

What is claimed is:

1. A measurement system for use in analyzing an operation of process equipment within a process, comprising:
   a plurality of sensors, including at least one non-intrusive sensor disposed external to a component within the process containing a material, wherein each of the plurality of sensors measures a different physical process phenomenon within the process associated with the material in the component to produce a sensor measurement indicative of the respective physical process phenomenon; and
   a logic module communicatively coupled to each of the plurality of sensors to receive the sensor measurements, the logic module including a logic engine and a model that relates measurements of the values of each of the different physical process phenomenon to a further physical process phenomenon, wherein the logic module operates on a computer processor device to determine a value of the further physical process phenomenon using the model and the sensor measurements.

2. The measurement system of claim 1, wherein each of the plurality of sensors is disposed in a different one of a set of process devices and wherein the logic module is disposed in a further process device separate from each of the set of process devices.

3. The measurement system of claim 1, wherein each of the plurality of sensors is disposed in a different one of a set of process devices and the logic module is disposed in one of the set of process devices, wherein the logic module is communicatively coupled to one of the sensors via an internal communication connection within the one of the set of process devices and is communicatively coupled to one or more of the other of the plurality of sensors via an external communication connection.

4. The measurement system of claim 1, wherein the logic module is coupled to one or more of the plurality of sensors via a process control protocol communication network.

5. The measurement system of claim 1, wherein the logic module is communicatively coupled to one or more of the plurality of sensors via a near field communications communication link.

6. The measurement system of claim 1, wherein the logic module is communicatively coupled to one or more of the plurality of sensors via a radio frequency identification communication link.

7. The measurement system of claim 1, wherein the logic module provides power to one or more of the sensors via a radio frequency communication link.

8. The measurement system of claim 1, wherein the logic module includes a further logic engine to detect a potential fault with one or more of the plurality of sensors.

9. The measurement system of claim 8, wherein the further logic engine performs fault detection based on a comparison of the sensor measurements from the plurality of sensors using the model.

10. The measurement system of claim 1, wherein the model is a principle component analysis model.

11. The measurement system of claim 1, wherein the model is a partial least squares model.

12. The measurement system of claim 1, wherein the model is an empirical model.

13. The measurement system of claim 1, wherein the further physical process phenomenon is a different type of physical process phenomenon than any of the physical process phenomenon measured by any of the plurality of sensors.

14. The measurement system of claim 1, wherein each of the plurality of sensors measures a different type of physical process phenomenon.

15. The measurement system of claim 1, wherein the further physical process phenomenon is the same type of physical process phenomenon measured by at least one of the plurality of sensors but relates to the type of physical process phenomenon at a different location than the physical process phenomenon measured by the at least one of the plurality of sensors.

16. The measurement system of claim 1, wherein the further physical process phenomenon is the same type of physical process phenomenon measured by at least one of the plurality of sensors and relates to the type of physical process phenomenon at the same location as the physical process phenomenon measured by the at least one of the plurality of sensors.

17. The measurement system of claim 1, wherein the further physical process phenomenon is a different type of physical process phenomenon than the physical process phenomena measured by any of the plurality of sensors but relates to the same physical location as the physical process phenomenon measured by at least one of the plurality of sensors.

18. The measurement system of claim 1, wherein each of the plurality of sensors measures a different type of physical process phenomenon.

19. The measurement system of claim 1, wherein two or more of the plurality of sensors measures a different type of physical process phenomenon at the same physical location.

20. The measurement system of claim 1, wherein two or more of the plurality of sensors measures the same type of physical process phenomenon at different physical locations within the process.

21. The measurement system of claim 1, further including a host device communicatively connected to the logic module to receive the determined value of the further physical process phenomenon.

22. The measurement system of claim 21, wherein the logic module is communicatively coupled to one or more of the plurality of sensors using a first communication technique and the logic module is communicatively coupled to the host device using a second communication technique different than the first communication technique.

23. A method of determining a physical process parameter, comprising:
    measuring a plurality of different physical process phenomenon within a process to produce a measurement value indicative of each of the physical process phenomenon, wherein at least one measurement value is produced by a non-intrusive sensor disposed external to a component within the process containing a material associated with the measurement value;
    communicating each of the measurement values to a logic module via a communication link;
    processing, using a computer device, the measurement values with a model that relates each of the different physical process phenomenon to a further physical process phenomenon to determine a value of the further physical process phenomenon using the model and the sensor measurements; and
    communicating the value of the further physical phenomenon as the physical process parameter to a host device.

24. The method of claim 23, wherein measuring the plurality of different physical process phenomenon within the process includes measuring each of the plurality of different physical process phenomenon using a non-intrusive sensor.

25. The method of claim 24, wherein communicating each of the measurement values to a logic module via a communication link includes communicating one or more of the measurement values via a common communication link.

26. The method of claim 24, wherein communicating each of the measurement values to a logic module via a communication link includes communicating two or more of the measurement values via different communication links.

27. The method of claim 24, wherein communicating each of the measurement values to a logic module includes communicating one of the measurement values via a near field communications communication link.

28. The method of claim 24, wherein communicating each of the measurement values to a logic module includes communicating one of the measurement values via a radio frequency identification communication link.

29. The method of claim 24, further comprising using a sensor to make one of the measurements and providing power to the sensor via a radio frequency communication link.

30. The method of claim 24, further including using a computer device to detect a potential fault with one or more of the non-intrusive sensors.

31. The method of claim 30, wherein detecting a potential fault includes comparing the plurality of measurements using the model.

32. The method of claim 24, wherein processing the measurement values with a model includes processing the measurement values with a principle component analysis model.

33. The method of claim 24, wherein processing the measurement values with a model includes processing the measurement values with a partial least squares model.

34. The method of claim 24, wherein the further physical process phenomenon is a different type of physical phenomenon than any of the measured physical phenomenon associated with the measurements.

35. The method of claim 24, wherein measuring the plurality of different physical process phenomenon within the process to produce a measurement value indicative of each of the physical process phenomenon includes measuring a different type of physical phenomenon for measurement to produce the measurement values.

36. The method of claim 24, wherein the further physical phenomenon is the same type of physical phenomenon associated with at least one of the plurality of measurements, but relates to the type of physical phenomenon at a different location than the physical process phenomenon associated with the at least one of the plurality of measurements.

37. The method of claim 24, wherein communicating each of the measurement values to a logic module via a communication link includes communicating at least one of the measurement values to the logic module via a first type of communication link and wherein communicating the value of the further physical phenomenon to a host device includes communicating the value of the further physical phenomenon via a second type of communication that is different than the first type of communication link.

38. The method of claim 37, wherein the first communication link is a wireless communication link and the second communication link is a wired communication link.

39. The method of claim 37, wherein the second communication link is a process protocol based communication link.

40. The method of claim 24, further including using the further physical parameter value at the host to detect a device problem within the process plant.

41. The method of claim 24, further including using the further physical parameter value at the host to perform on-line control of the process.

42. A process measurement system for use in a process, comprising:
a plurality of non-intrusive sensors to be disposed within the process, wherein each of the plurality of non-intrusive sensors measures a different physical process phenomenon within the process to produce a sensor measurement indicative a physical process phenomenon; and
a logic module disposed in a process device that is communicatively coupled to each of the plurality of non-intrusive sensors to receive the sensor measurements, the logic module including a logic engine and a model that relates measurements of the values of each of the different physical process phenomenon to a further physical process phenomenon, wherein the logic module operates on a computer processor device to determine a value of the further physical process phenomenon using the model and the sensor measurements;
a host device communicatively coupled to the logic module;
a first communication network disposed between one or more of the plurality of non-intrusive sensors and the logic module; and
a second communication network disposed between the logic module device and the host device.

43. The process measurement system of claim 42, wherein the model is an empirical model.

44. The process measurement system of claim 42, wherein the model is a principle component analysis model.

45. The process measurement system of claim 42, wherein the model is a partial least squares model.

46. The process measurement system of claim 42, wherein each of the plurality of non-intrusive sensors is disposed in a different one of a set of process devices and wherein the logic module is disposed in a process device separate from each of the set of process devices.

47. The process measurement system of claim 42, wherein each of the plurality of non-intrusive sensors is disposed in a different one of a set of process devices and the logic module is disposed in the process device that is one of the set of process devices, wherein the logic module is communicatively coupled to one of the non-intrusive sensors via an internal communication connection within the process device and is communicatively coupled to one or more of the other of the plurality of non-intrusive sensors via a first communication network.

48. The process measurement system of claim 42, wherein the first communication network comprises a near field communications communication link.

49. The process measurement system of claim 42, wherein the first communication network comprises a radio frequency identification communication link.

50. The process measurement system of claim 42, wherein the process device provides power to one or more of the non-intrusive sensors via a radio frequency communication link.

51. The process measurement system of claim 42, wherein the logic module includes a further logic engine to detect a potential fault with one or more of the plurality of non-intrusive sensors.

52. The process measurement system of claim 51, wherein the further logic engine performs fault detection based on a comparison of the sensor measurements from the plurality of non-intrusive sensors.

53. The process measurement system of claim 42, wherein each of the plurality of non-intrusive sensors measures a different type of physical process phenomenon.

54. The process measurement system of claim 42, wherein each of the plurality of non-intrusive sensors measures a different type of physical process phenomenon and the further physical process phenomenon is a different type of physical process phenomenon then any of the physical process phenomenon measured by the plurality of non-invasive sensors.

55. The process measurement system of claim 42, wherein two or more of the plurality of non-intrusive sensors measures a different type of physical process phenomenon at the same physical location.

56. The process measurement system of claim 42, wherein the first communication network and the second communication network are different communication networks.

57. The process measurement system of claim 42, wherein one of the plurality of sensors measures a process control parameter used to control the process and a secondary physical phenomenon, wherein the secondary physical phenomenon is the measured physical phenomenon sent to the logic module.

58. The process measurement system of claim 42, wherein the plurality of non-intrusive sensors and the logic module are located in close proximity within the process.

* * * * *